United States Patent [19]
Perazzoli, Jr.

[11] Patent Number: 5,125,086
[45] Date of Patent: Jun. 23, 1992

[54] VIRTUAL MEMORY PAGING APPARATUS WITH VARIABLE SIZE IN-PAGE CLUSTERS

[75] Inventor: Frank L. Perazzoli, Jr., Redmond, Wash.

[73] Assignee: Digital Equipment Corporation, Maynard, Mass.

[21] Appl. No.: 373,874

[22] Filed: Jun. 29, 1989

[51] Int. Cl.[5] .............................................. G06F 12/06
[52] U.S. Cl. .............................. 395/425; 364/DIG. 1
[58] Field of Search ... 364/200 MS File, 900 MS File

[56] References Cited

U.S. PATENT DOCUMENTS

| | | | |
|---|---|---|---|
| 4,231,088 | 10/1980 | Hammer et al. | 364/200 |
| 4,356,549 | 10/1982 | Chueh | 364/200 |
| 4,742,447 | 5/1988 | Duvall et al. | 364/200 |
| 4,758,951 | 7/1988 | Sznyter, III | 364/200 |
| 4,774,659 | 9/1988 | Smith et al. | 364/200 |
| 4,777,589 | 10/1988 | Boettner | 364/200 |
| 4,797,810 | 1/1989 | McEntee et al. | 364/200 |

*Primary Examiner*—Stuart N. Hecker
*Assistant Examiner*—Reba I. Elmore
*Attorney, Agent, or Firm*—Flehr, Hohbach, Test, Albritton & Herbert

[57] ABSTRACT

A virtual memory management system and method in which the mechanism for swapping in pages of memory in secondary storage replaces the overhead of retrieving pages from secondary storage by swapping logically contiguous clusters of pages each time that a page from secondary memory is needed. To improve the efficiency of in-page clustering, the size of the clusters which are read in are heuristically adjusted. Clustered pages are not entered into the working set until they are accessed by the process. Instead, the cluster of pages read in from secondary memory are initially entered a "standby list" of pages which are more eligible for reallocation than pages in the working set of the process. If the process does not access a particular cluster page within a relatively short period of time of its entry onto the standby list it is reallocated by the system's memory manager. In this way, in-page cluster pages do not replace potentially more valuable pages in the working set until those pages are actually requested by the process. Depending on whether the cluster pages are used before being reallocated, cluster sizes in corresponding portions of the virtual memory space are increased or decreased.

17 Claims, 4 Drawing Sheets

VIRTUAL MEMORY PAGING APPARATUS WITH VARIABLE SIZE IN-PAGE CLUSTERS

This application is related to the application entitled VIRTUAL MEMORY PAGE TABLE PAGING APPARATUS AND METHOD, in the name of Frank Louis Perazzoli, Jr., Ser. No. 07/373,873, filed on the same date as this application, which is hereby incorporated by reference.

BACKGROUND OF THE INVENTION

1. Field of the Invention

The present invention relates generally to virtual memory systems for multitasking computer systems and particularly to methods and systems for efficiently retrieving pages of memory from secondary memory storage.

2. Summary of the Prior Art

Referring to FIG. 1, a computer system 10 is illustrated. The computer system is comprised of a central processing unit (hereinafter "CPU") 20, a plurality of processes 22-30 and primary memory 32, secondary memory 34 and a memory manager 36. Directly connected to the CPU 20 is the primary memory 32. The primary memory 32 is a high speed random access memory. It facilitates CPU processing by permitting fast memory access times. Secondary memory, on the other hand, is usually a large, relatively slow memory device. For example, magnetic disc drives are frequently used as secondary memory. Secondary memory is generally characterized by a slow access time and being relatively inexpensive, compared to primary memory.

In the computer system 10, secondary memory 34 is much larger than primary memory 32. Each process 22-30 performs operations using primary memory 32 which is the only memory that a process "sees." Additional memory is located in the secondary memory and when that information is needed it is transferred into primary memory for the requesting process to access. Since primary memory is small, relative to secondary memory, information is constantly swapped in and out of primary memory. The device which controls the transfer of data between primary and secondary memory is called a virtual memory manager 36 (hereinafter sometimes called "memory manager"). The memory manager 36 utilizes a virtual memory scheme.

Many virtual memory schemes are used in the prior art. An example of one is now illustrated. In FIG. 1, a computer system 10 concurrently runs several processes 22-30 using the CPU 20. Each of these processes 22-30 is allocated a certain portion of primary memory 32. More specifically, each process has a virtual memory space which may far exceed the amount of primary memory that is assigned to it. The portion of each virtual memory space which is currently stored in primary memory is specified by a "working set" list 22a-30a which is maintained for each process. Thus each process has a "working set," and all other data for the process is stored in a secondary memory 34.

The virtual memory manager 36 controls which portions of each process's virtual memory space is to be stored in primary memory and dynamically changes the allocation of primary memory as required.

Referring to FIG. 2, in a virtual memory system, both physical and virtual memory spaces are divided into equally sized "pages." The memory manager 36 (shown in FIG. 1) keeps track of the pages for each process running in the computer 10 by using a table called a "page table" 38. The page table 38 for any one process 22 contains many "page table entries" in (PTEs) 42, each of which specifies the location and status of one page in the process's virtual memory space.

Since a process typically uses many pages of memory, there will be a corresponding number of PTEs 42. These PTEs are stored in an array (i.e., table) which itself occupies multiple pages of memory. For example, a process might use four thousand pages of memory and the four thousand PTEs might occupy four pages. Each page used to store PTEs is called a "page table page" 40 (hereinafter "PTP").

When a page of data is requested by a process and that page is not in primary memory 32, the memory manager 36 finds that page in secondary memory and copies it into primary memory 32. Often, when a page in secondary memory is requested by a process 22, logically contiguous pages will subsequently be requested. To improve the efficiency of swapping in pages from secondary memory, a "cluster" of logically contiguous pages are read into primary memory along with the requested page.

In-page clustering can sometimes be inefficient because the additional pages read in may not be used by the process. It has been found by the inventors that the optimal size of in-page clusters tends to be different in different parts of a process's virtual memory space. In many instances, a process will sequentially access logically contiguous pages in certain portions of its virtual memory space, but will access pages in a more random fashion in other portions of its virtual memory space.

The present invention makes in-page clustering more efficient by providing a system and method for heuristic modification of the number of cluster pages brought into primary memory. Cluster sizes are heuristically adjusted for different regions of a process's virtual memory space in accordance with the memory usage patterns of the process.

OBJECT AND SUMMARY OF THE INVENTION

Accordingly, it is the object of the present invention to provide a virtual memory scheme with heuristically modified in-page read clustering.

In summary, the present invention is a virtual memory management system and method for a multitasking computer system. The virtual memory management system attempts to reduce the overhead of retrieving pages from secondary storage by swapping logically contiguous clusters of pages each time that a page from secondary memory is needed. To further improve the efficiency of in-page clustering, the present invention provides a mechanism for heuristically adjusting the size of the clusters which are read in so as to maximize the benefits of using a cluster swapping scheme.

The present invention also improves the efficiency of in-page clustering by placing the additional pages in each cluster onto a "standby list" of pages which are more eligible for reallocation than pages in the working set of the process. Thus the clustered pages are not entered into the working set until they are actually accessed by the process, and if the process does not access a particular cluster page within a relatively short period of time of its entry onto the standby list it is reallocated by the system's memory manager. In this way, in-page cluster pages do not replace potentially more valuable pages in the working set until those pages are actually requested by the process.

In the preferred embodiment of the invention, the method of "tagging" the additional cluster pages to denote specify which pages are on the standby list is also used to track which cluster pages are used by a process before being reallocated. When the cluster pages are used before being reallocated, cluster sizes in corresponding portions of the virtual memory space are increased. When cluster pages are reallocated before being used, cluster sizes are decreased in corresponding portions of the virtual memory space.

The attainment of the foregoing and related objects, advantages and features of the invention should be more readily apparent to those skilled in the art, after review of the following detailed description of the invention, taken together with the drawings, in which:

DETAILED DESCRIPTION OF THE DRAWINGS

DETAILED DESCRIPTION OF THE PREFERRED EMBODIMENTS

Figure 1:
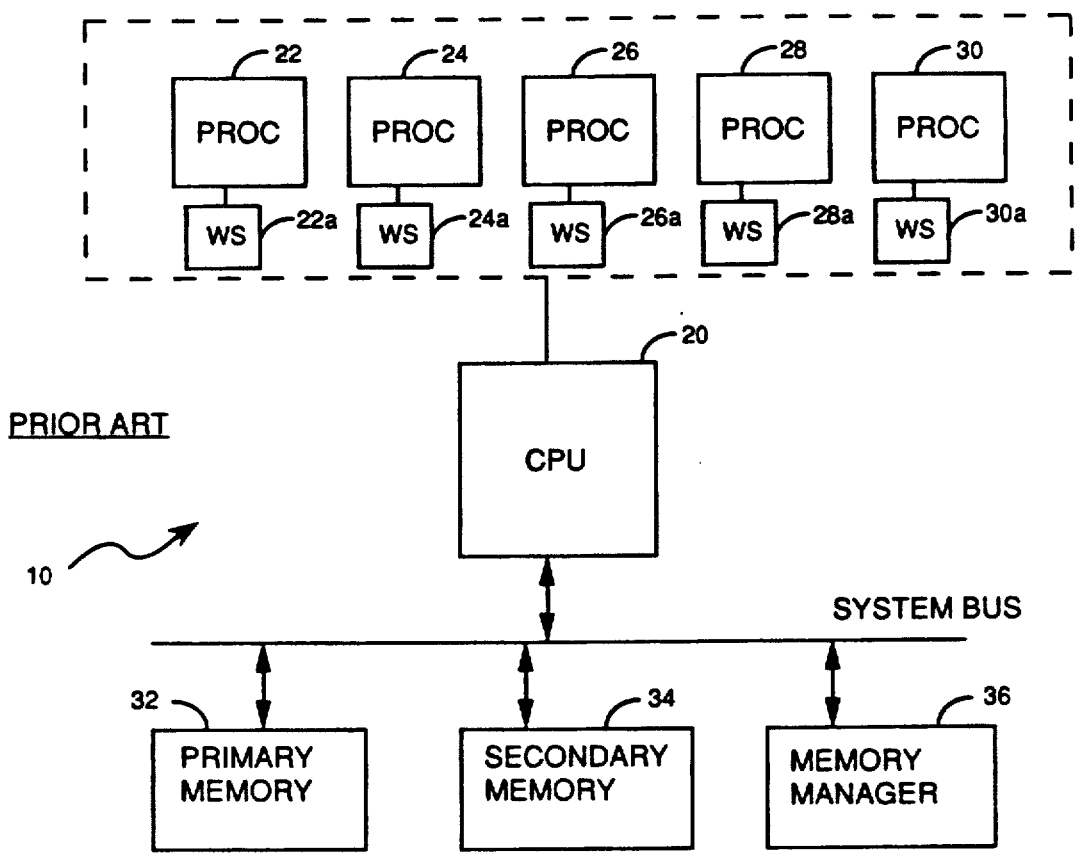
FIG. 1 is a block diagram of a computer system with a virtual memory management subsystem.
Figure 3:
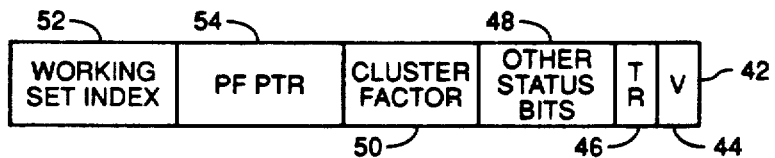
FIG. 3 illustrates a data structure for a page table entry of the preferred embodiment.

Referring to FIG. 3, a data structure for a page table entry (PTE) 42 is illustrated. As indicated in the preceding discussion, the PTE 42 indicates status and location for a page of data. Every page in the virtual memory space of a process has a PTE 42. For every process (22-30 of FIG. 1) there is a page table 38. The page table 38 for a particular process contains PTEs for all the pages of memory that are used by that process. From the perspective of the process, the page table is a continuous list. In actuality, the page table may have a plurality of levels.

The PTE data structure 42 has a plurality of fields 44-52. The state of these individual fields determine the overall status of the PTE 42. It is important to note that status of a PTE 42 and the status of the corresponding page are one and the same. Thus, when a PTE is said to have a particular status, it is actually the corresponding virtual memory page which has that status. The valid "V" field 44 in the PTE is a binary value which indicates when a PTE 42 is valid. A valid PTE corresponds to a page that is in the working set. Conversely, invalid PTEs are not in the working set. There are several distinct invalid states as discussed below.

The transition "TR" field 46 is a binary value which indicates whether the PTE 42 is "in transition." A PTE 42 is in transition if it is in primary memory 32, but not in the working set. Conversely, a page that is not in transition is either "valid" or in secondary memory 34.

Each PTE 42 contains a field 50 called the cluster factor. The cluster factor 50 specifies the number of contiguous pages which should be read in when the page corresponding to the PTE is read in.

Space 48 is allotted in the PTE 42 for other status bits. Some of these other status bits work in conjunction with the invalid designation. For instance, these other status bits could be used to indicate that a page in secondary memory is in an image or a paging file. An image file is any data or program file which can be retained after the process terminates. A paging file, on the other hand, represents a compilation of temporary data.

Another invalid state which may be designated by a PTE 42 is the "invalid and demand zero" state. When a particular process requires an additional page of memory, (not specific data from secondary memory, but one that it can use), a page of zeroes is created and moved into the working set. When the page of zeroes is added to the process' working set, the PTE becomes valid.

Another state that a PTE 42 may have is "inaccessible." A PTE with an "inaccessible" status corresponds to a portion of virtual memory that is undefined and unusable.

Whenever a process tries to access a page not currently in primary memory, thereby causing a page fault, the memory manager 36 tries to find a set of logically contiguous pages, including the target page which has been faulted on, equal in size to the cluster factor 50. Logically contiguous pages are pages at sequentially ordered addresses. To do this, the memory manager 36 first forms the largest possible set of contiguous pages, up to the size of the cluster factor 50, starting at the target page and moving toward larger virtual memory addresses. If the resulting set of pages is smaller than the cluster factor 36, the memory manager 36 tries to expand the cluster by scanning lower virtual memory address. Note that any virtual memory page which is in primary memory (i.e., valid) will terminate the cluster, and that a cluster will not be expanded if it requires reading in a swapped out page table page. In summary, a page fault on a single page results in the reading in of a number of pages.

The PTE 42 also contains a working set index 52. The working set index 52 points to the "slot" in the working set list 22a occupied by the corresponding page. The index 52 is zero when the page is not in the working set. PTEs additionally contain a page frame pointer 54 (hereinafter "PFP"). The PFP 54 points to the physical location of the page which the PTE references. When a page is valid, the PFP 54 points to a page in primary memory 32. When a page is in the paging or an image file, the PFP 54 points to a page in the secondary memory 34.

Figure 4:
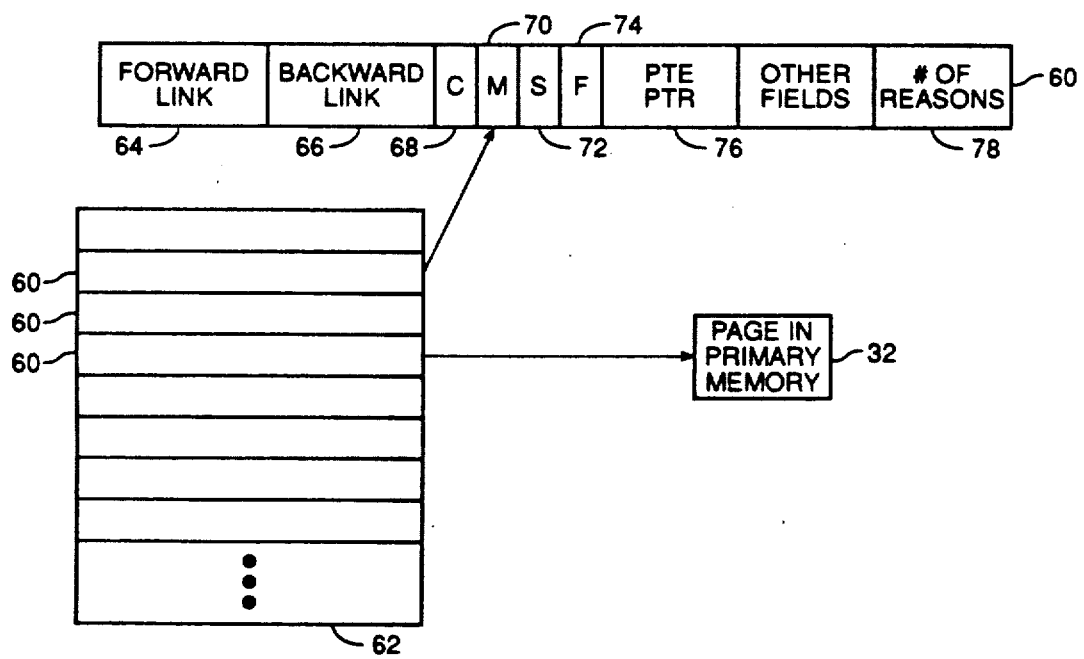
FIG. 4 illustrates a data structure of a page frame record of the preferred embodiment.

Referring to FIG. 4, a page frame record (hereinafter "PFR") 60 and a PFR database 62 are shown. A PFR 60 exists for every page in primary memory 32. All of the PFRs 60 are contained in a PFR database 62 which is an array of records 60 in primary memory 32. Each PFR 60 contains a forward link 64 and a backward link 66 which can be used to put the corresponding page on one of several doubly linked lists, which will be described below.

Fields 70-74 indicate whether the page to which the PFR 60 points is on the modified, standby or free list, etc. These lists are described in detail below with reference to FIG. 5. The modify bit 70 indicates whether the page to which a PFR 60 points is on the modified list. The standby bit 72 indicates whether the page to which a PFR points is on the standby list. The free list bit 74 indicates whether the page to which the PFR 60 points to is on the free list.

The cluster bit 68 indicates whether the page referenced by the PFR 60 was brought into primary memory as a cluster page. When a page is brought into primary memory as a cluster page it is placed on the standby list. Therefore, such a page would have both its cluster bit 68 and its standby bit 72 activated to indicate its status.

The PTE pointer 76 points to the PTE, if any, which corresponds to the same page in primary memory as this PFR 60. Note that every page in the working set of a process has both a PTE 42 and a PFR 60 which stored data indicating different aspects of the status of that page.

Figure 2:
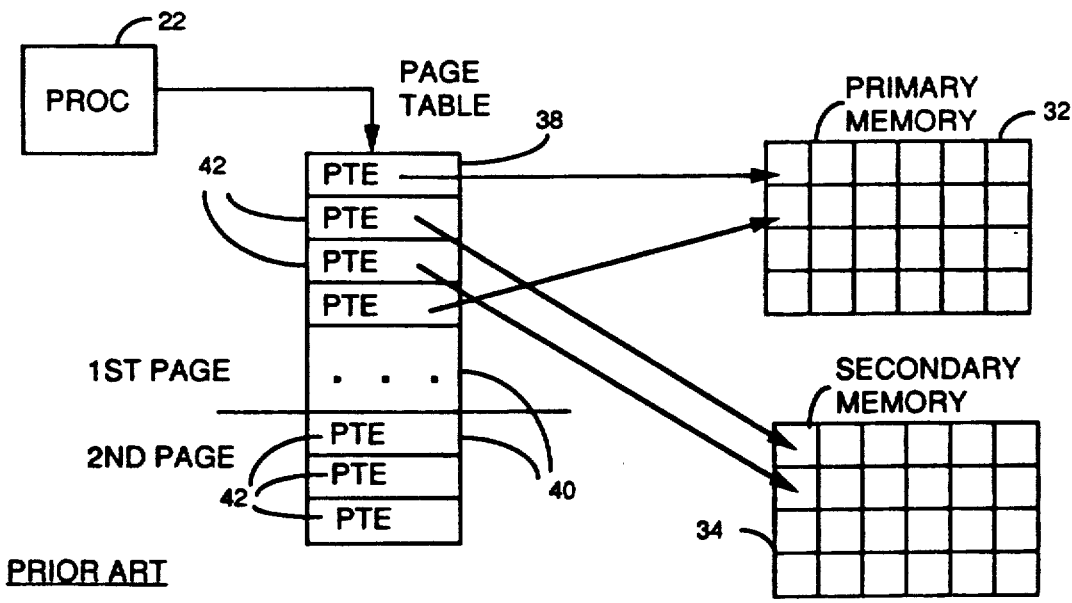
FIG. 2 is a block diagram which illustrates one aspect of the memory mapping structure for the virtual memory space of one process.

Another field in the PFR 60 is called the "number of reasons to keep a page table page in primary memory" (hereinafter "number-of-reasons") 78. The number-of-reasons 78 is equal to the number of PTEs in a PTP (40 of FIG. 2) that are in the valid state or "in transition" state. When the number-of-reasons 78 is zero for a PTP 40, the PTP 40 may be moved out of primary memory 32 and into secondary memory 34.

Figure 5:
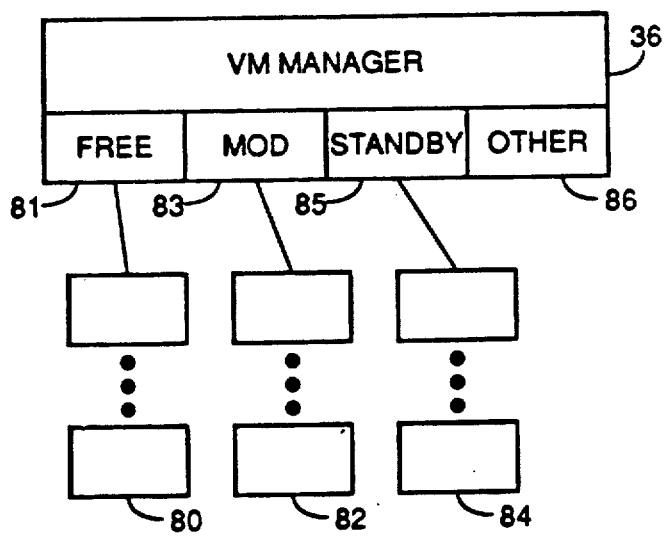
FIG. 5 is a block diagram of a plurality of memory managing lists of the preferred embodiment.

Referring to FIG. 5, a plurality of lists and their relation to the virtual memory manager 36 are illustrated. In primary memory 32, each process has a number of pages that are used by its particular working set. An additional portion of primary memory contains lists that are used by the virtual memory manager 36. More specifically, the memory manager 36 tries to maintain a set of free pages which can be allocated to the various processes when new pages are read in from secondary memory. The memory manager maintains a free list 80, a modified list 82, and a standby list 84. Each list is a doubly linked list of pages in the primary memory 32, as shown for the standby list in FIG. 7.

The free list 80 is a doubly linked list of physical memory pages that are available for use in the primary memory 32 by any process 22-30. Pages are added to a tail of the list 80 and always removed from a head. A page may be placed on the free list 80 when its number-of-reasons 78 in its PFR 60 becomes zero (i.e., the number-of-reasons to keep it in primary memory is zero). Associated with the free list 80 is a list head 81 that contains pointers to the first and last pages on the list 80, and a count of the number of pages in the list 80.

The modified list 82 is a doubly linked list of physical memory pages that need to have their contents written back to secondary memory before reuse. A page is placed in the modified list 82 when it is removed from the working set of a process and the modify bit 70 of its PFR 60 is set. When the modify bit 70 is set, it indicates that the page it points to has been altered since it was last read into primary memory 32 (e.g., from an image file) or since the page was first created if the page did not previously exist.

Associated with the modified list 82 is a list head 83 that points to the first and last pages on the list 82, and a count of the number of pages in the list 82. Memory management 36 also maintains a high and low limit count for the modified page list 82. When the number of pages on the modified list 82 exceeds the high limit, some of the modified pages are written to secondary memory 34.

The standby list 84 is a doubly linked list of physical memory pages that are available for re-use. Pages are normally added to the tail and removed from the head of the list 84. When a fault occurs on a page on the standby list 84 (discussed below), the page is removed from the standby list 84 regardless of its position in the list. A valid page is placed on the standby list 84 when its number of reason field 78 in the PFR 60 becomes zero and the modify bit 70 of its PFR is not set. The standby list 84 is also the position in primary memory where clustered pages are located until they are read into a process's working set. Associated with the standby list 84 is a list head 85 (see FIG. 7) that points to the first and last pages on the list 84 and which also stores a count of the number of pages in the list 84.

The other lists 86 include a zeroed page list which provides zero pages to the free list 80, and a bad page list which links together all the pages of memory that are considered unusable due to memory parity errors.

Figure 6:
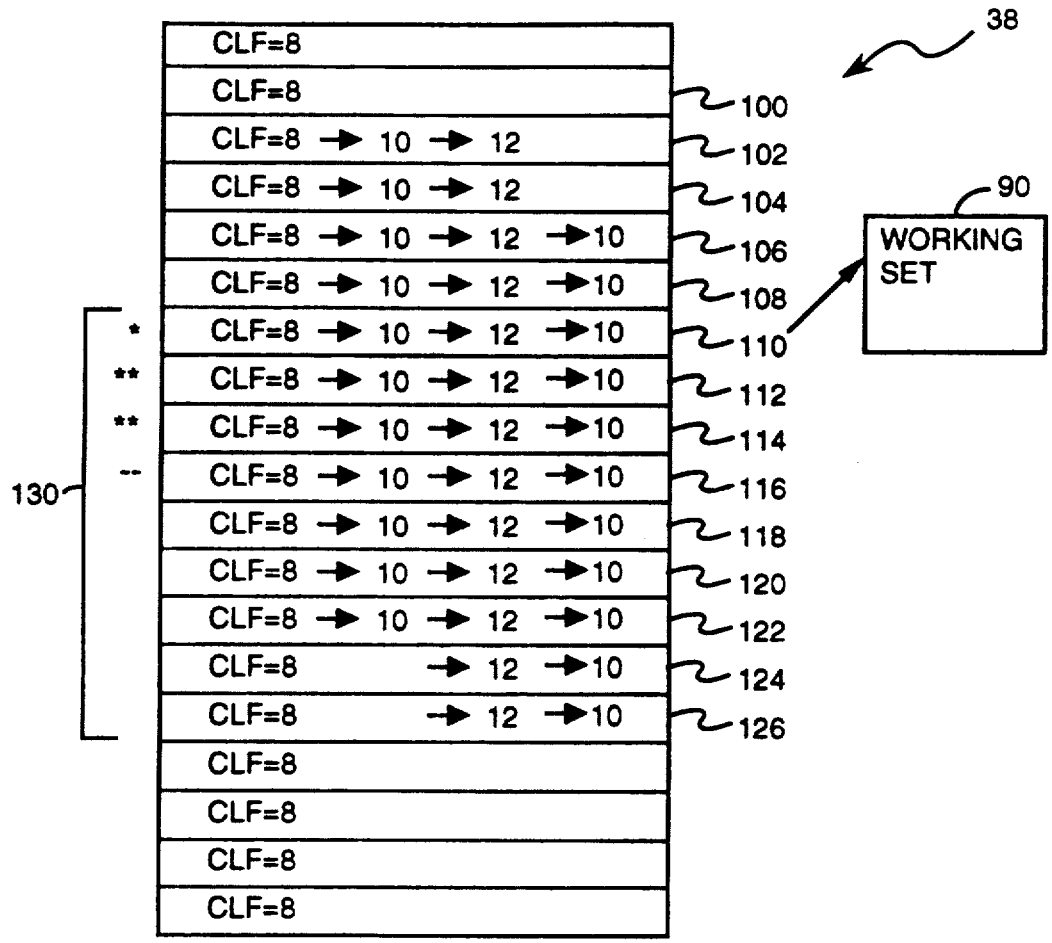
FIG. 6 is an illustration of a page table during in-page read clustering.
Figure 7:
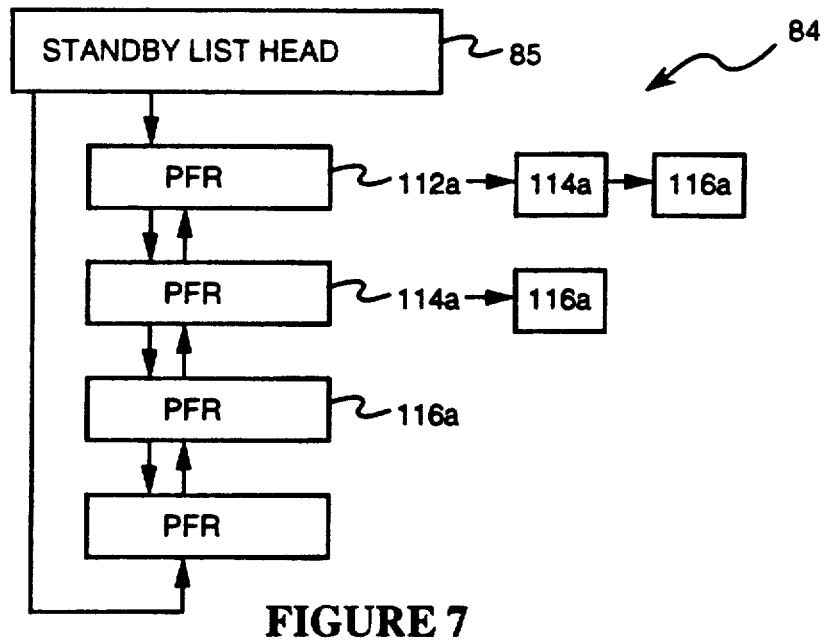
FIG. 7 is an illustration of a standby list during in-page read clustering.

Referring to FIGS. 6 and 7, a portion of a page table page 38 and standby list 84 are shown. As stated above, each PTE 100-126 in the page table 38 has a cluster factor 50. When a page is faulted on (requested by a process, but not currently in primary memory), that page and its cluster pages are read into primary memory 32. By way of example, if PTE 110 is faulted on, the memory manager 36 will recognize that PTE 110 has a cluster factor of 8. The memory manager 36 will then read in cluster pages until a number of pages equal to the cluster factor is found (or some other terminating event occurs). In this example, the memory manager will identify the next eight logically contiguous pages as those referenced by PTEs 112-126. The resulting cluster of pages is identified by reference numeral 130.

The page referenced by PTE 110, which was faulted on, will be read directly into the working set 90 for the process. The status of PTE 110 will be changed to valid and not in transition by the updating of its valid bit 44 (of FIG. 3). The clustered pages 112-126 will be added to the tail of the standby list 84. These PTEs 112-126 will be updated to indicate invalid and "in transition" because they are now on the standby list 84. In addition, the cluster bit in the corresponding PFR will be set. Note that although the terminology is used that a page is "placed on the standby list 84", it really the PFR 60 for that page which is placed on the standby list 84. Therefore, the terminology of placing a page on the standby list 84 means placing the PFR 60 that refers to that particular page on the standby list 84 (the same nomenclature doubly linked lists). The clustered pages 130 are added to the tail of the standby list in the order they were removed from secondary memory 34. This means that the cluster page with the lowest virtual address is usually closest to the head of the standby list 84.

The PFR 60 for the page referenced by PTE 112 is closest to the head 85 of the standby list 84. From the standby list 84, the page referenced by PFR 112a may be entered into the working set 90 when requested. A race conditions develops, however, in that being closest to the list head 85, the PFR for 112a is the next likely candidate to be swapped out on to the free list 80. Therefore, a race is created as to whether a clustered page will be read into the working set or swapped out off of the standby list before being accessed. Note however, that there may be a number of pages in the standby list 84 prior to the cluster pages.

If a clustered page is swapped out before being accessed, its cluster factor is decremented by two. The new cluster factor is given to all the PTEs within a virtual memory range plus or minus the new cluster factor divided by two. Alternatively, if the page is read into the working set, then the cluster factor for that PTE is incremented by two and that new cluster factor is similarly spread for a range of plus or minus the new cluster factor divided by two.

Referring to the example shown in FIG. 6, if the page referenced by PTE 112 is read into the working set before being swapped off the standby list 84, the cluster factor 50 of that PTE 112 is incremented by two. Since the cluster factor 50 (see FIG. 3) for PTE 112 was initially 8, its new cluster factor is 10. That new number (lo) is then divided by two to give a range of five. The new cluster factor of 10 is given to all the PTEs five above (102-110) and five below (114-122) PTE 112.

When the page referenced by PTE 112 is moved into the working set 90, its corresponding PFR 112a is moved off the standby list to a working set list and the cluster bit in the PFR 112a is cleared. Note that PFRs corresponding to PTEs have the same reference numeral, with an "a" appended. Simultaneously the PTE 112 is updated to indicate that this page is now "valid." PFR 114a is now at the top of the standby list 84 and enters the race condition that PFR 112a faced previously.

In FIG. 6, if the page referenced by PTE 114 is read into the working set the cluster factor 50 for PTE 114 is incremented by two to twelve (12). The new cluster factor, equal to twelve, is divided by two, which equals six. Therefore, the cluster factors for the six PTEs 102-112 below and the six PTEs 116-126 above PTE 114 are updated to the new cluster factor 12. The PTE 114 is also updated to indicate that the corresponding page is now "valid." The PFR 114a for the page is also updated to indicate that its page is in the working set, to remove it from the standby list 84, and to clear the cluster bit 68. PFR 116a is now at the head of the standby list 84.

If, however, a page loses the race condition, then its cluster factor 50, and those around it, is decremented. In FIG. 6, PTE 116 looses the race condition and is swapped off the standby list 84 and on to the free list 80. When the memory manager 36 returns the page referenced by PFR 116a to secondary memory, it will notice that its cluster bit (68 of FIG. 4) is set. The memory manager, will then decrement the cluster factor in the corresponding PTE 116 from 12 to 10. The new cluster factor (10) will be written to the five previous (106-114) and the five subsequent PTEs (118-126). PTE 116 will be updated to indicate that the corresponding page is invalid and not in transition state. The PFR 116a will no longer exist.

Using the above described clustering system it is possible to bring pages into primary memory 32 without expelling pages from a working set 90. The clustered pages are brought into the standby list 84 where they may be directly accessed with an updating of their PTEs 42. The heuristic cluster factor modification provides an efficient cluster factor 50 for use by the memory manager 36.

It should further be apparent to those skilled in the art that various changes in form and details of the invention as shown and described may be made. It is intended that such changes be included within the spirit and scope of the claims appended hereto.

For example, the amount by which the cluster factor is adjusted whenever a cluster page is used or swapped out may be different in different applications of the invention. In addition, there will usually be a maximum value for the cluster factor. The adjustment factor may also be different when increasing and decreasing the cluster size. The size adjustment factor(s) will depend, in part on the page size.

Another factor that may vary in different embodiments is the range of pages for which the cluster factor will be adjusted. The goal is to efficiently adjust the cluster factor to reflect local usage patterns within the virtual memory space of each process. Therefore the range of pages adjusted will depend on the page size, as well as other factors.

What is claimed is:

1. In a multitasking computer having a multiplicity of simultaneously active processes, the computer having primary and secondary memory for storing pages of memory associated with each of said processes, each process having an associated set of virtual memory pages; a virtual memory management system comprising:

page table means associated with each said active process, each said page table means storing data specifying for each virtual memory page of said associated active process an address in said primary or secondary memory and a cluster value;

in-paging means coupled to said page table means for moving a specified virtual memory page from said secondary memory into said primary memory; said in-paging means including means for moving from secondary memory into said primary memory a cluster of virtual memory pages at addresses logically contiguous to the address of said specified virtual memory page, as specified in said page table means; the number of pages in said cluster having a maximum value corresponding to said cluster value specified in said page table means for said specified virtual memory page;

page reallocating means for reallocating pages of said primary memory storing unused ones of said pages in said cluster so as to allow other virtual pages to be stored therein; and cluster adjustment means, coupled to said page table means and said page reallocating means, for determining whether each of said pages in said cluster have been used by one of said active processes, and for adjusting said cluster value specified in said page table means for said specified virtual memory page in accordance with the number of said pages in said cluster which have been used.

2. The virtual memory management system of claim 1, said cluster adjustment means having means for replacing said cluster value stored in said page table means for a plurality of virtual memory pages adjacent said specified virtual memory page with said adjusted cluster value;

whereby cluster values are adjusted for a number of adjacent virtual memory pages.

3. The virtual memory management system of claim 2, wherein the number of virtual memory pages for which said cluster value is replaced by said cluster adjustment means is varies in accordance with said adjusted cluster value.

4. In a multitasking computer having a multiplicity of simultaneously active processes, the computer having primary and secondary memory for storing pages of memory associated with each of said processes, each process having an associated set of virtual memory pages; a virtual memory management system comprising:

page table means associated with each said active process, said page table means including a page table entry for each virtual memory page of said associated active process; each said page table entry including an address value specifying an address in said primary or secondary memory for a corresponding one of said virtual memory pages, and a cluster value;

in-paging means coupled to said page table means for moving a specified virtual memory page from said secondary memory into said primary memory; said in-paging means including means for moving from secondary memory into said primary memory a cluster of virtual memory pages at addresses logically contiguous to the address of said specified virtual memory page, as specified in the corresponding page table entries of said page table means; the number of pages in said cluster having a maximum value corresponding to said cluster value in the page table entry corresponding to said specified virtual memory page;

page reallocating means for reallocating pages of said primary memory storing unused ones of said pages in said cluster so as to allow other virtual pages to be stored therein; and cluster adjustment means, coupled to said page table means and said page reallocating means, for determining whether each of said pages in said cluster have been used by one of said active processes, and for adjusting said cluster value in said page table entry corresponding to said specified virtual memory page in accordance with the number of said pages in said cluster which have been used.

5. The virtual memory management system of claim 4, said cluster adjustment means having means for increasing said cluster value in said page table entry corresponding to said specified virtual memory page in proportion to the number of said pages in said cluster which have been used by said one of said processes and for decreasing said cluster value in proportion to the number of said pages in said cluster which have not been used.

6. The virtual memory management system of claim 4, said cluster adjustment means having means for storing said adjusted cluster value in a plurality of adjacent page table entries in said page table means; whereby cluster values are adjusted for a number of adjacent virtual memory pages.

7. The virtual memory management system of claim 6, wherein the number of page table entries in which said adjusted cluster value is stored is varies in accordance with said adjusted cluster value.

8. In a multitasking computer having a multiplicity of simultaneously active processes, the computer having primary and secondary memory for storing pages of memory associated with each of said processes, a virtual memory management system comprising:

working set means for each said active process for storing data specifying pages of primary memory allocated to said active process;

page table means associated with each said active process, each said page table means including a page table entry for each virtual memory page of said associated active process; each said page table entry including an address value specifying an address in said primary or secondary memory for a corresponding one of said virtual memory pages, a working set value indicating whether the corresponding page is specified in said working set means for said associated active process, and a cluster value;

standby list means for storing data representing a list of primary memory pages designated for reallocation;

in-paging means coupled to said page table means and said standby list means for moving a specified virtual memory page from said secondary memory into said primary memory; said in-paging means including means for moving from secondary memory into said primary memory a cluster of virtual memory pages at addresses logically contiguous to the address of said specified virtual memory page, as specified in the corresponding page table entries of said page table means; the number of pages in said cluster having a maximum value corresponding to said cluster value in the page table entry corresponding to said specified virtual memory page;

said in-paging means including means for adding said specified virtual memory page to the pages listed in said working set means, and means for adding the other pages in said cluster to the pages represented by said standby list means and for storing data indicating that said other pages are cluster pages;

means for removing selected ones of said cluster pages from said pages represented by data stored in said standby list and for adding said selected ones of said cluster pages to the pages listed in said working set means; said removing means including means for increasing the cluster value in the page table entries corresponding to said selected ones of said cluster pages; and means for reallocating cluster pages represented by data stored in said standby list, including means for resetting said address value in the page table entries corresponding to said reallocated cluster pages to an address value in secondary memory, and for decreasing the cluster value in the page table entries corresponding to said reallocated cluster pages;

whereby the cluster value for virtual memory pages is modified based on the usage of said cluster pages.

9. The virtual memory management system of claim 8, said reallocating cluster means including means for replacing the cluster value in page table entries adjacent to said reallocated cluster pages with said decreased cluster value.

10. The virtual memory management system of claim 8, said removing means including means for replacing the cluster value in page table entries adjacent to said removed cluster pages with said increased cluster value.

11. The virtual memory management system of claim 10, wherein the number of page table entries for which said cluster value is replaced by said removing means is varies in accordance with said increased cluster value.

12. A method of in-page read clustering in a multitasking computer having a multiplicity of simultaneously active processes, the computer having primary and secondary memory for storing pages of memory associated with each of said processes, each process having an associated set of virtual memory pages, the steps of the method comprising:

providing a page table for and associated with each said active process, each said page table storing data specifying for each virtual memory page of said associated active process an address in said primary or secondary memory and a cluster value;

moving from secondary memory into said primary memory a cluster of virtual memory pages at addresses logically contiguous to the address of a specified virtual memory page, as specified in said page table; the number of pages in said cluster having a maximum value corresponding to said cluster value for said specified virtual memory page;

reallocating pages of said primary memory storing unused ones of said pages in said cluster so as to allow other virtual pages to be stored therein; and adjusting said cluster value for said specified virtual memory page in accordance with the number of said pages in said cluster which have been used.

13. The method of in-page read clustering set forth in claim 12, said adjusting step increasing said cluster value corresponding to said specified virtual memory page in proportion to the number of said pages in said cluster which have been used and decreasing said cluster value in proportion to the number of said pages in said cluster which have not been used.

14. The method of in-page read clustering set forth in claim 12, said adjusting step including the step of replacing said cluster value for a plurality of virtual memory pages adjacent said specified virtual memory page with said adjusted cluster value;

whereby cluster values are adjusted for a number of adjacent virtual memory pages.

15. The method of in-page read clustering set forth in claim 14, wherein the number virtual memory pages for which said cluster value is replaced by said adjusting step is varies in accordance with said increased cluster value.

16. A method of in-page read clustering in a multitasking computer having a multiplicity of simultaneously active processes, the computer having primary and secondary memory for storing pages of memory associated with each of said active processes, each active process having an associated set of virtual memory pages, the steps of the method comprising:

providing a page table associated with each said active process, each said page table storing data specifying for each virtual memory page of said associated active process an address in said primary or secondary memory;

storing a multiplicity of cluster values, including at least one cluster value for each said active process;

upon each occurrence of a memory fault at a specified virtual page by one of said active processes, moving from secondary memory into said primary memory a cluster of virtual memory pages at addresses logically contiguous to the address of said specified virtual memory page; the number of pages in said cluster having a maximum value corresponding to a selected one of said multiplicity of cluster values;

monitoring usage and non-usage of said pages in each said cluster of virtual memory pages moved into said primary memory; and adjusting said multiplicity of cluster values in accordance usage and non-usage of said pages in corresponding clusters of virtual memory pages moved into said primary memory.

17. In a multitasking computer having a multiplicity of simultaneously active processes, the computer having primary and secondary memory for storing pages of memory associated with each of said active processes, each active process having an associated set of virtual memory pages; a virtual memory management system comprising;

a page table associated with each said active process, each said page table storing data specifying for each virtual memory page of said associated active process an address in said primary or secondary memory;

stored cluster value data representing a multiplicity of cluster values, including at least one cluster value for each said active process;

in-paging means, coupled to said page table and said stored cluster value data, for responding to each occurrence of a memory fault at a specified virtual page by one of said active processes by moving from secondary memory into said primary memory a cluster of virtual memory pages at addresses logically contiguous to the address of said specified virtual memory page; the number of pages in said cluster having a maximum value corresponding to a selected one of said multiplicity of cluster values; and cluster adjustment means, coupled to said stored cluster value data and said in-paging means, for (A) monitoring usage and non-usage of said pages in each said cluster of virtual memory pages moved into said primary memory, and (B) adjusting said multiplicity of cluster values in accordance usage and non-usage of said pages in corresponding clusters of virtual memory pages moved into said primary memory.

* * * * *

UNITED STATES PATENT AND TRADEMARK OFFICE
CERTIFICATE OF CORRECTION

PATENT NO. : 5,125,086
DATED : June 23, 1992
INVENTOR(S) : Frank L. Perazzoli, Jr.

It is certified that error appears in the above-identified patent and that said Letters Patent is hereby corrected as shown below:

Column 8,
Line 58, after "means" delete "is"

Column 9,
Line 50, after "stored" delete "is"

Column 10,
Line 55, after "means" delete "is"

Column 11,
Line 30, after "number" insert -- of --
Line 32, after "step" delete "is"

Column 12,
Line 11, after "dance" insert -- with --
Line 46, after "accordance" insert -- with --

Signed and Sealed this

Twenty-sixth Day of July, 2005

JON W. DUDAS
*Director of the United States Patent and Trademark Office*